United States Patent [19]

Mann

[11] Patent Number: 5,749,603
[45] Date of Patent: May 12, 1998

[54] HOLDING DEVICE FOR A HOSE CLIP

[75] Inventor: Stephan Mann, Bieber, Germany

[73] Assignee: Rasmussen GmbH, Maintal, Germany

[21] Appl. No.: 645,797

[22] Filed: May 16, 1996

[30] Foreign Application Priority Data

May 20, 1995 [DE] Germany ............... 195 18 628.1

[51] Int. Cl.$^6$ .................... F16L 33/20; B65D 63/02
[52] U.S. Cl. ................ 285/23; 285/242; 285/252; 24/205; 24/20 R
[58] Field of Search ................. 285/23, 242, 252, 285/253; 24/20 R, 20 CW, 20 TT, 20 S

[56] References Cited

U.S. PATENT DOCUMENTS

| | | | |
|---|---|---|---|
| 4,635,966 | 1/1987 | Herman | 285/23 |
| 4,882,814 | 11/1989 | Takahashi. | |
| 4,951,363 | 8/1990 | Takahashi. | |
| 5,297,823 | 3/1994 | DuBost | 285/23 |
| 5,414,905 | 5/1995 | Kimura et al.. | |
| 5,620,209 | 4/1997 | Sauer | 285/23 |

FOREIGN PATENT DOCUMENTS

| | | |
|---|---|---|
| 0 284 468 | 9/1988 | European Pat. Off.. |
| 2 602 572 | 2/1988 | France. |
| 2 630 808 | 11/1989 | France. |
| 27 21 090 | 12/1977 | Germany. |
| 3446568 | 7/1986 | Germany ............... 285/253 |
| 1061250 | 1/1966 | United Kingdom. |
| 2200420 | 1/1987 | United Kingdom. |

*Primary Examiner*—Eric K. Nicholson
*Attorney, Agent, or Firm*—Darby & Darby

[57] ABSTRACT

A holding device for securing a hose clip in position relative to a pipe connection over which a hose is to be positioned. The holding device has a plurality of holding arms arranged around an axis. The holding arms are connected by a connecting body and each has an internal, radially inwardly directed groove. All grooves are in the same transverse plane of the holding arms and are of the same width as the clip band so that the clip band can be received therein. Preferably, a hose clip in the form of a spring band clip with a clip band having radially outwardly angled clamping jaws is used. A U-shaped clamp, which holds the clamping jaws together when the spring band clip is in an open position, may be connected to the connecting body by a connecting member which permits the clamp to pivot away from the clamping jaws but which prevents the clamp from being separated and thereby becoming lost.

25 Claims, 2 Drawing Sheets

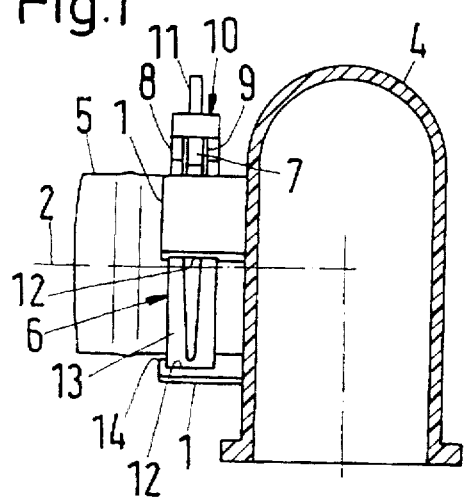
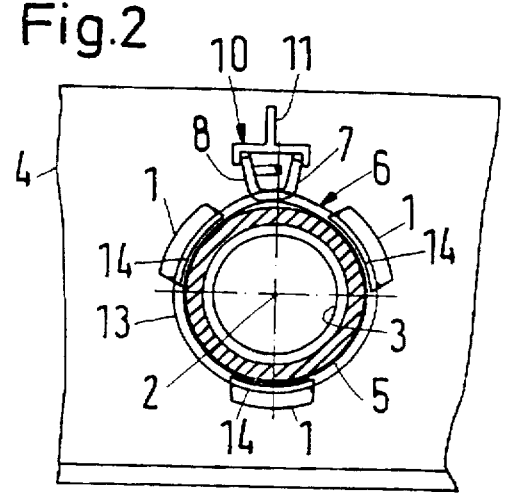
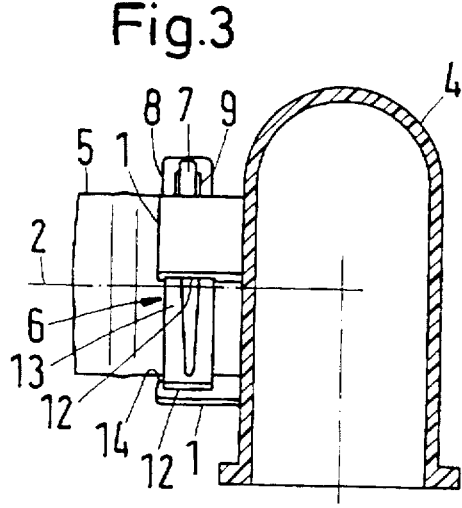
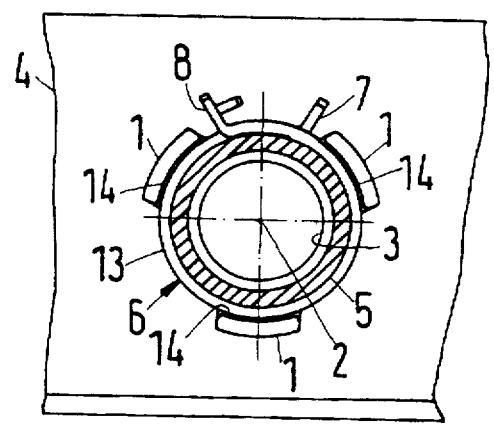
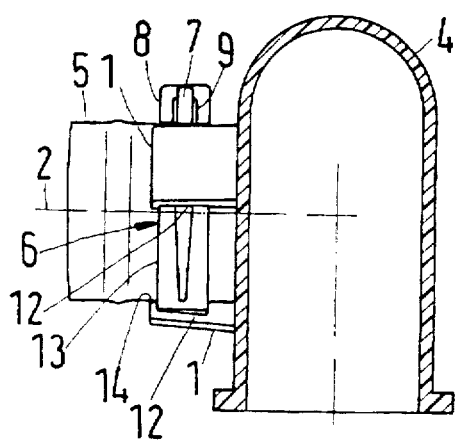
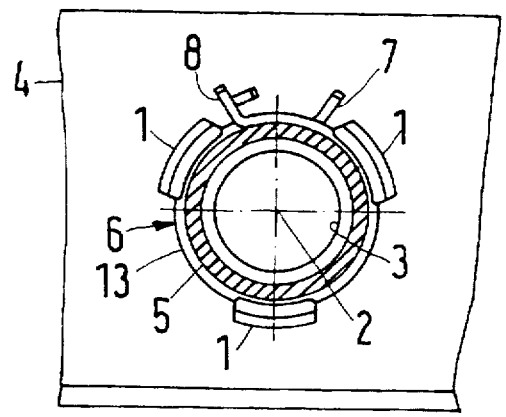

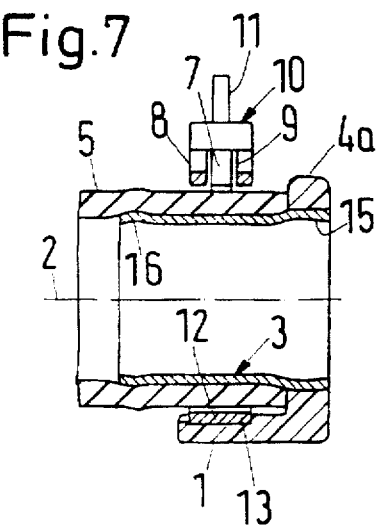
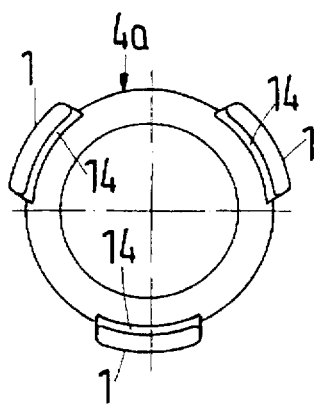
Fig.7  Fig.8
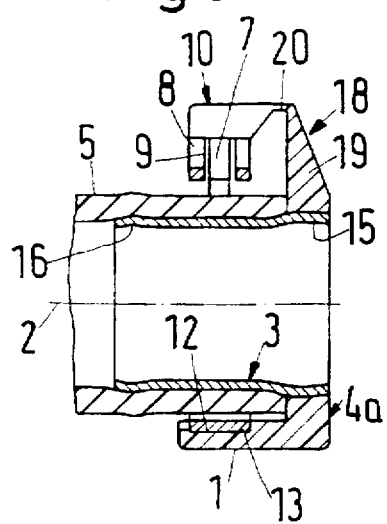
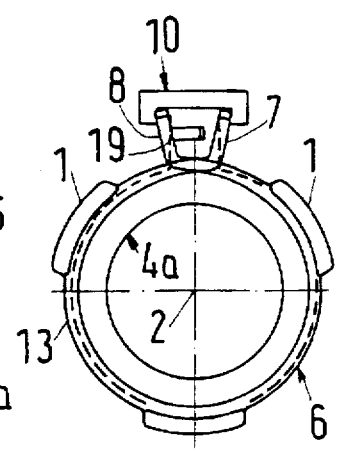
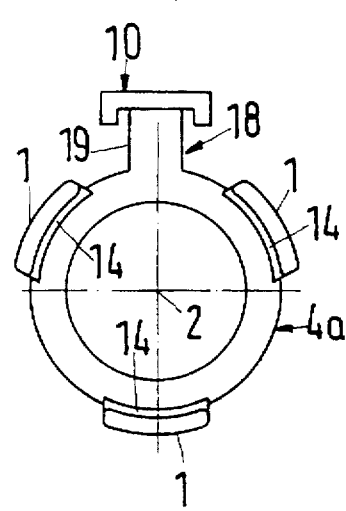
Fig.9  Fig.10  Fig.11
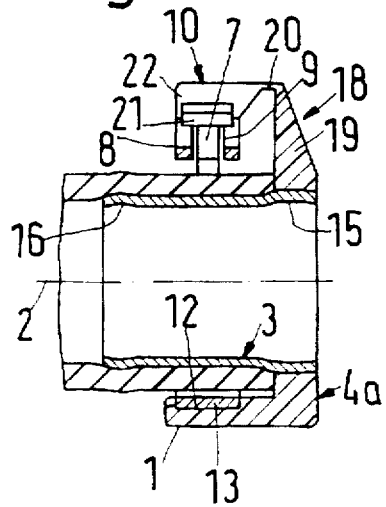
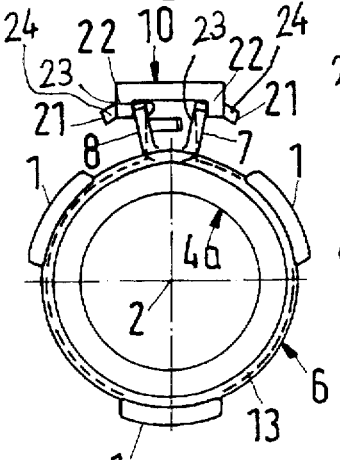
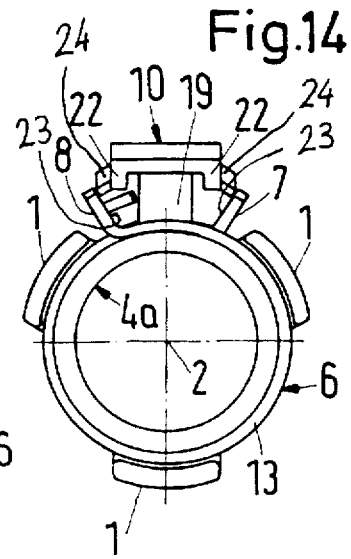
Fig.12  Fig.13  Fig.14

HOLDING DEVICE FOR A HOSE CLIP

BACKGROUND OF THE INVENTION

The present invention relates to a holding device for securing a hose clip in position relative to a tubular element over which a hose is connected. The holding device has a plurality of holding arms connected together at one end by a connecting body and arranged approximately parallel to the axis of the holding device along a circumference of a substantially circular region about the axis, i.e., the holding arms are positioned substantially equidistant from the axis. Each of the holding arms has on a radially inward side a groove. The grooves of the holding arms are in the same transverse plane, and are of a width corresponding to the axial width of the clip band of the hose clip in order to receive the clip band.

A known holding device is shown in European Patent Application 0 284 468. The holding device comprises a sleeve which is integrally or positively lockingly connected, via a connecting body, to the tubular element over which the hose is fit. The connecting body is a ring portion of the sleeve, from which holding arms axially project. This type of holding device is unsuitable for a spring band clip. The outside diameter of the spring band clip is smaller than the inside diameter of the holding device before the hose is introduced into the spring band clip. The spring band clip could therefore easily fall out of the holding device before the hose is introduced into the spring band clip.

In addition, the holding device requires a considerable amount of material in the region of the ring portion. Furthermore, when the tubular element is in the form of a pipe connection nipple integrally formed or molded on a housing such as the housing of the radiator of a motor vehicle, a sufficient spacing must be maintained between the housing and the holding device so that a molding tool can engage between the housing and a holding rib which serves to provide the positive locking connection between the pipe connection and the holding device. When the pipe connection and the holding device are formed as a single part, a sufficient spacing must be maintained between the housing and the holding device in order to mold the holding rib or the holding device on the pipe connection and the latter on the housing. The pipe connection must therefore be longer, by that spacing, than it would be without a holding device. A longer pipe connection is not only more expensive in terms of material, but also takes up more space which may not be available, for example, in the engine compartment of a motor vehicle.

The holding device shown in French Published Application 2 630 808 A1 is also not suitable for a spring band clip, for the same reasons as the above-mentioned holding device.

A holding device for a spring clip with substantially radially outwardly angled clamping jaws in the end portions thereof is shown in French Published Application 2 602 572 A1. The end portion of one of the jaws has a peripheral slot through which the end portion of the other jaw is passed. The holding device includes an approximately U-shaped clamp which engages over the clamping jaws in the open (expanded) position of the spring band clip, and holds the jaws together. The clamp either is pivotally mounted on one of the clamping jaws, or is a separate attachment. The holding device also has two projections formed on a housing of the radiator of a motor vehicle. The projections are formed on both sides of a pipe connection formed on the housing. The projections have vertical, inwardly facing, upwardly open and downwardly closed grooves into which tongues, which are bent over radially outwardly at the one edge of the clip band, can be introduced from above in order to secure the position of the spring band clip around, but at a radial spacing from, the pipe connection before a hose is pushed on to the pipe connection and into the spring band clip. The spring band clip is released for clamping by pivoting the clamp away from one of the clamping jaws or withdrawing the clamp from both clamping jaws so that the jaws and clip are free to contract around the hose. This holding device is not suitable for commercially available spring band clips that do not have tongues. The spring band clips with bent-over tongues at the edge that are necessary for this type of holding device are not only more expensive in terms of material costs but also involve a greater amount of waste and require additional bending work during manufacturing.

SUMMARY OF THE INVENTION

It is therefore an object of the present invention to provide an improved holding device that is suitable for hose clips in the form of a spring band clip, the holding device of the present invention permitting more secure retention of the hose clip when in both the open and closed positions of the hose clip than achieved by prior holding devices.

It is a further object of the present invention to provide a holding device that permits retention of the clamp used to maintain the clip in its open position so that the clamp remains with the holding device when the clamp is not in use, i.e., while the clip is in the closed position.

In accordance with the principles of the present invention, the above and further objects are accomplished by providing a holding device having a plurality of holding arms that hold a hose clip. The holding arms are positioned along the circumference of a circular region about an axis of the holding device (i.e., the arms are substantially equidistant from the axis) and are connected together at one end with a connecting body. The hose clip that is preferably used with the holding device of the present invention has a spring band clip with approximately radially outwardly extending angled clamping jaws at the end portions thereof. The end portion of one of the jaws has a peripheral slot through which the end portion of the other of the jaws is passed. The clip further includes an approximately U-shaped clamp which engages over the clamping jaws to hold the jaws together and thereby maintain the spring band clip in the open position. The hose clip, in its closed position, clamps a hose to a tubular element about which the holding device is positioned.

The connecting body surrounds the tubular element, in particular a hose connection onto which a hose is to be pushed, and is either fixedly premounted thereon or integrally formed therewith. That ensures that the holding device, together with the hose clip accommodated therein, retains a defined position relative to the tubular element until the hose is inserted between the tubular element and the hose clip. The clip can then be closed precisely in the desired position on the hose so that it securely clamps the hose on the tubular element.

Preferably the connecting body is formed by a part of the motor vehicle radiator housing. This form of the invention does not require a ring portion for connecting the holding arms together and to the tubular element. Thus, the tubular element can be shorter than when the pipe connection is not formed on the radiator housing.

Alternatively, the connecting body may be in the form of a ring, and is pressed onto a thickened portion of the tubular element. That permits simple pre-assembly and fixing of the holding device on the tubular element, particularly if the holding device cannot be formed integrally with another component forming the connecting body, for example a part of a motor vehicle radiator.

Preferably, the holding arms are elastically bendable and have grooves for accommodating the clip band. The diameter of the circumference (along which the holding arms are positioned) is preferably selected so that, in their relaxed condition, the holding arms bear against the periphery of the open clip band (i.e., when the clip band is not taut around the hose) when the clip band is accommodated in the grooves. This allows for the hose clip to be axially pressed along and between the holding arms, with the holding arms being slightly elastically flexed open, until the clip band snaps into the grooves.

Alternatively, the diameter of the circumference is selected so that, in their stressed condition, the holding arms are bent radially outwardly and bear against the open (stressed) clip band accommodated in the grooves. In their relaxed, unstressed condition, the holding arms bear against the closed clip band which is secured around the hose (and which is partially slack). In that case the hose clip is secured in its position by the holding arms not only in the open position in which the clip does not grip the hose, but also in the closed position in which the clip grips the hose.

The clamp may be connected to the connecting body by a connecting member which permits the clamp to pivot with respect to the clamping jaws. This configuration additionally provides that the clamp, which holds the spring band clip in the expanded open position as long as the clamp is engaged over the clamping jaws, is secured in the pre-assembled open position of the spring band clip. The clamp is pivotable with respect to the clamping jaws so that the clamp may be pivoted away and withdrawn from the clamping jaws to permit the spring band clip to contract around the hose. Preferably, the clamp still remains connected via the connecting member to the connecting body of the holding device. That ensures that the clamp does not spring away from the holding device upon being withdrawn from the clamping jaws, for instance when a hose is fixed in the engine compartment of a motor vehicle where it could possibly cause damage. The clamp thus can be re-used in a simple manner after being released from the spring band clip.

The connecting member may be elastically bendable, which makes it easier for the clamp to be pivoted away or re-used. In particular, the connecting member may have an elastically bendable carrier connected to the connecting body and connected to the clamp via a film hinge. In that respect, both the elasticity of the carrier and the film hinge facilitate removal of the clamp from its pre-assembled position over the clamping jaws or engagement of the clamp over the spring band clip.

It is desirable that laterally outwardly facing surfaces of the limbs of the clamp, which face away from each other, are at approximately the same or a somewhat greater spacing than mutually inwardly facing surfaces of the ends of the clamping jaws when the spring clip is in the released, closed position (i.e., when the jaws are moved apart so that the clip secures the hose on the tubular element). The clamp may be fitted between the inner surfaces of the clamping jaws in the closed position of the spring band clip (in which the clip securely grips the hose) in order to prevent the spring band clip from accidentally opening.

The present invention and developments thereof are described in greater detail in the following detailed description with reference to the accompanying drawings showing preferred embodiments, wherein like reference characters represent like elements, the scope of the invention being set out in the appended claims.

BRIEF DESCRIPTION OF THE DRAWINGS

FIG. 1 is a side view partly in section of a first embodiment of a holding device formed in accordance with the principles of the present invention, the hose clip held securely therein in an open position;

FIG. 2 is a front axial view of the holding device of FIG. 1, showing the hose to be clamped in cross-section;

FIGS. 3 and 4 show the embodiment of FIGS. 1 and 2, in corresponding views, but with the hose clip closed;

FIGS. 5 and 6 show, respectively, a side view partly in section and a front axial view of a second embodiment of the present invention, the hose clip being in the closed position;

FIG. 7 shows a side sectional view of a third embodiment of the present invention with the hose clip in the open position;

FIG. 8 shows a front axial view of the embodiment of FIG. 7 without the hose and hose clip;

FIGS. 9 and 10 show a side sectional view and a front axial view, respectively, of a fourth embodiment of the present invention, with the hose clip in the open position in FIG. 9 and without the hose in FIG. 10;

FIG. 11 shows a front axial view of the holding device of FIGS. 9 and 10 without the hose and hose clip; and FIGS. 12–14 show a fifth embodiment having a modified clamp, FIGS. 12 and 13 showing views similar to those of FIGS. 9 and 10 but with the modified clamp, and FIG. 14 showing a front axial view of the holding device without the hose and with the hose clip in the closed position.

DETAILED DESCRIPTION OF THE INVENTION

In the holding device shown in FIGS. 1–4, three holding arms 1 are arranged at preferably equal angular spacings along a circumference of a substantially circular region around axis 2 (i.e., holding arms 1 are substantially equidistant from axis 2 of the holding device). At one end, holding arms 1 are connected by a connecting body 4, in this case the preferably plastic top of the radiator of the internal combustion engine of a motor vehicle. The holding arms 1 preferably are also formed of a plastic material and are preferably integrally connected to connecting body 4.

Tubular element 3, in this case a pipe connection on which pipe 5 is to be mounted, is integrally connected to the edge of an opening in connecting body 4 by welding, melting, or gluing. Tubular element 3 preferably is formed of metal, but may also be comprised of a plastic material. The longitudinal axis of tubular element 3 is substantially parallel to axis 2. One end portion of a hose 5, in this case a cooling water hose, is fixed over the tubular element 3. For that purpose there is provided a hose clip 6 which is shown in the form of a spring band clip. Alternatively, hose clip 6 may be of a different type, such as a worm thread clip. Hose clip 6 has radially outwardly angled clamping jaws 7 and 8 at its end portions. One end portion has a peripheral slot 9 through which the other end portion is passed.

The holding device also has an approximately U-shaped clamp 10 which engages over the clamping jaws 7, 8 in the open position of the spring band clip 6 and holds the jaws 7, 8 together, as shown in FIGS. 1 and 2. Thus, clamp 10 helps maintain spring band clip 6 in its open, stressed position. A tongue 11, projecting radially outwardly from the transverse portion of clamp 10, is preferably provided for engaging the clamp 10 with a pair of pliers in order to pull clamp 10 off the clamping jaws 7, 8. When clamp 10 is pulled off, spring band clip 6 contracts from its stressed open position shown in FIGS. 1 and 2 into the closed position shown in FIGS. 3 and 4. In the closed position, clip 6 is secured firmly around hose 5, applying an inwardly directed clamping force, and thus sealingly clamps hose 5 on tubular element 3.

Holding arms 1 preferably each have a groove 12 defined on their radially inward side. Grooves 12 are in the same transverse plane and hold hose clip 6 in a predetermined, prepositioned location relative to tubular element 3 and thus also relative to the hose 5 which is later fitted over tubular element 3, as shown in FIGS. 1 and 2. All grooves 12 are disposed in substantially the same transverse plane of the holding arms 1 and are of a width corresponding to the axial width of the clip band 13 of hose clip 6 so that grooves 12 are shaped to receive clip band 13. The holding arms 1 are also elastically bendable, so that they can be bent open radially outwardly, and are provided at the radially inward edges of their free ends with an inclined surface 14 (FIG. 2). Inclined surfaces 14 facilitate the pushing of hose clip 6 into position between holding arms 1.

After the clamping jaws 7, 8 have been pushed against each other (i.e., towards each other to stress spring band clip 6) by means of a tool and the clamp 10 has been fitted over the free ends of the clamping jaws 7, 8, as shown in FIGS. 1 and 2, the hose clip 6 can be axially pressed between the holding arms 1. Pushing hose clip 6 between holding arms 1 causes the holding arms 1 to be urged slightly radially outwardly, by virtue of the clip band 13 running along inclined surfaces 14 at the free ends of holding arms 1, until the clip band 13 snaps into grooves 12 in holding arms 1. It is however also possible for hose clip 6 to be axially introduced between the holding arms 1 while hose clip 6 is in the closed position, before clamp 10 is fitted over clamping jaws 7, 8, so that holding arms 1 need not be radially bent open (i.e., urged outwardly). If the hose clip 6 is closed when inserted, clip band 13 is expanded into the open position, once it is aligned with grooves 12, by pressing the clamping jaws 7, 8 together until clip band 13 is engaged within grooves 12 in the holding arms 1. Hose clip 6 is then secured in the expanded or open position as shown in FIG. 2 by means of clamp 10. In both cases (insertion of either an open or closed hose clip 6), the operation of introducing hose clip 6 between holding arms 1 is extremely simple.

After the hose clip 6 has assumed the position shown in FIGS. 1 and 2, in which it is pre-positioned relative to the tubular element 3, the hose 5 can be inserted between the tubular element 3 and the hose clip 6. Tubular element 3 preferably includes a holding rib 16, similar to the rib shown in the embodiment of FIG. 7, for hose 5. After removal of clamp 10, hose clip 6 contracts and hose 5 is thereby accurately and securely clamped in the desired position on the tubular element 3, as shown in FIG. 3 and 4.

The embodiment of FIGS. 5 and 6 is substantially the same as that of FIGS. 1–4, except for the inclination of the holding arms 1 when in the relaxed condition (i.e., when no stress is applied to holding arms 1). In the embodiment of FIGS. 1–4, the holding arms 1 are formed so that in their relaxed condition the holding arms 1 are parallel to axis 2 and bear against the periphery of the open clip band 13 positioned within grooves 12, as shown in FIG. 2. In contrast, in the embodiment of FIGS. 5 and 6 holding arms 1 are slightly inclined radially inwardly when in their relaxed condition. Accordingly, holding arms 1 of the embodiment of FIGS. 5 and 6 are bent radially outwardly when in their stressed condition into a position approximately parallel to axis 2 and bear against the open, stressed clip band 13 within grooves 12. When holding arms 1 are in their at least substantially relaxed condition, as shown in FIGS. 5 and 6, holding arms 1 also bear against the released unstressed clip band 13 which is closed around the hose. In other respects, the embodiment of FIGS. 5 and 6 is of the same configuration as the embodiment of FIGS. 1–4. The holding arms 1 of the embodiment of FIGS. 5 and 6 contribute to securing the hose clip 6 in position in the illustrated closed condition of the hose clip 6.

The embodiment of FIGS. 7 and 8 differs from that of FIGS. 1–4 essentially in that the connecting body 4a is in the form of a closed ring and is pressed on a thickened portion 15 at an end of the tubular element 3 remote from the end over which the hose is pushed. As also in the preceding embodiments, the end over which the hose is pushed is preferably provided with a holding rib 16 for the hose 5. The tubular element 3 preferably is comprised of metal and is radially enlarged in the region of the thickened portion 15 and the holding rib 16.

In the embodiment of FIGS. 7 and 8, tubular element 3 is connected to a component (not shown), for example the housing of a radiator for the internal combustion engine of a motor vehicle, either by being formed integrally therewith, or by being welded or fixed thereto in another manner. The embodiment shown in FIGS. 7 and 8 is advantageous in the situations in which it is not possible for the holding arms to be formed integrally with or joined directly to the component provided with the tubular element 3, such as a connecting nipple. The holding arms 1 of the embodiment of FIGS. 7 and 8 may also be of the same configuration as in the embodiment of FIGS. 5 and 6 or of FIGS. 1–4.

The embodiment of FIGS. 9–11 differs from that shown in FIGS. 7 and 8 only in that the clamp 10 is connected to the connecting body 4a (which, again, is in the form of a ring) via a connecting member 18 which permits the clamp 10 to pivot away from the clamping jaws 7, 8. For that purpose, the connecting member 18 is elastically flexible. Connecting member 18 has an elastically bendable carrier 19 connected to connecting body 4a. Carrier 19 is preferably in the form of a projection which projects radially outwardly from carrier body 4a and which preferably tapers radially outwardly. Clamp 10 is connected via film hinge 20 to carrier 19. Tongue 11 has been omitted from clamp 10 for the sake of simplicity.

The embodiment of FIGS. 9–11 has the advantage that the clamp 10 always remains connected to the connecting body 4a whether the hose clip 6 is in the open or the closed position and can therefore easily be re-used. Removal of clamp 10 from the clamping jaws 7, 8 is still a simple operation. Clamp 10 can be removed from the clamping jaws 7, 8 by means of a common tool, for example the blade of a screwdriver, by engaging the tool under the transverse web portion of clamp 10.

The embodiment of FIGS. 12–14 only differs from that of FIGS. 9–11 in that mutually remote surfaces 21 (laterally outwardly facing surfaces) of the limbs 22 of the clamp 10 are at approximately the same or a somewhat larger spacing than mutually inwardly facing surfaces 23 at the ends of clamping jaws 7, 8 when the spring band clip 6 is in the released, closed position (FIG. 14). As shown in FIGS. 12–14, surfaces 21 are provided at the free ends of lateral projections 24 of limbs 22. It is however also possible for limbs 22 to be correspondingly thicker so that surfaces 21 are at the same spacing as they are when projections 24 are provided.

In the embodiment of FIGS. 12–14, not only can clip 10 be fit over the free ends of clamping jaws 7, 8 in the open position of spring band clip 6, as shown in FIG. 13, but also, as in FIG. 14, clip 10 can be inserted between clamping jaws 7, 8 in the closed position of spring band clip 6. When clamp 10 is positioned between jaws 7 and 8, clamp 10 aids in securing spring band clip 6 in its closed position, in addition to the clip's own spring force.

While the foregoing description and drawings represent the preferred embodiments of the present invention, it will be understood that various additions, modifications and substitutions may be made without departing from the spirit and scope of the present invention as defined in the accompanying claims. In particular, it will be clear that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A holding device comprising:

a plurality of holding arms positioned substantially parallel to and around an axis; and a connecting body secured to said holding arms at one end of said holding arms to connect together said holding arms;

a tubular element secured to said connecting body and spaced from each of said holding arms;

a clip band having an axial width, wherein each of said holding arms has a radially inward side with a groove defined therein;

said grooves of said holding arms are in the same transverse plane and have a width corresponding to the axial width of the clip band so that the clip band may be received within said grooves.

2. A holding device as in claim 1, wherein said holding arms are elastically bendable and spaced substantially equidistant from said axis so that in their relaxed condition said holding arms bear against the periphery of the clip band accommodated within said grooves when the clip band is in an open position.

3. A holding device as in claim 1, wherein said holding arms are elastically bendable and spaced substantially equidistant from said axis so that in their stressed condition said holding arms are bent radially outwardly and bear against the open, stressed clip band accommodated within said grooves, and in their relaxed condition said holding arms bear against the released clip band.

4. A holding device as in claim 1, wherein the hose clip is a spring band clip having radially outwardly extending clamping jaws, said holding device further comprising a clamp for positioning over the clamping jaws of the spring band clip to maintain the hose clip in an open position.

5. A holding device as in claim 4, wherein:

said clamp has a transverse portion and a pair of limbs extending downwardly from said transverse portion to engage the clamping jaws of the hose clip; and mutually remote outwardly facing surfaces of said limbs of said clamp are at least at the same spacing as mutually inwardly facing surfaces of the clamping jaws in the released, closed position of the spring band clip so that said clamp is positionable between the clamping jaws to secure the spring band clip in the closed position.

6. A holding device as in claim 1, wherein said connecting body surrounds and is fixedly pre-mounted on the tubular element.

7. A holding device as in claim 1, wherein said connecting body surrounds and is formed integrally with the tubular element.

8. A holding device comprising:

a plurality of holding arms arranged substantially parallel to an axis;

a spring band clip having a clip band and radially outwardly extending jaws;

a connecting body secured to said holding arms at one end of said holding arms to connect together said holding arms;

a U-shaped clamp having a transverse portion and downwardly extending limbs, said limbs being selectively engagable with said jaws to selectively place said clip band in an open position; and a connecting member coupled between said connecting body and said clamp, said connecting member permitting said clamp to be pivoted away from the clamping jaws of the clip while remaining connected to said connecting body thereby permitting said limbs to be selectively disengagable from said jaws to place said clip band in a closed position, said connecting member being elastically bendable.

9. A holding device as in claim 8, wherein said connecting member further comprises:

an elastically bendable carrier connected to said connecting body; and a film hinge, said clamp being connected to said carrier via said hinge.

10. A holding device as in claim 8, wherein:

each of said holding arms has a radially inward side with a respective groove defined therein; and said grooves of said holding arms are in the same transverse plane and have a width corresponding to the axial width of the clip band so that the clip band can be received therein.

11. A holding device as in claim 10, wherein said holding arms are elastically bendable and spaced substantially equidistant from said axis so that in their relaxed condition said holding arms bear against the periphery of the clip band accommodated within said grooves when the clip band is in an open position.

12. A holding device as in claim 10, wherein said holding arms are elastically bendable and substantially equidistant from said axis so that in their stressed condition said holding arms are bent radially outwardly and bear against the open, stressed clip band accommodated within said grooves, and in their relaxed condition said holding arms bear against the released clip band in the closed position.

13. A holding device as in claim 8, wherein mutually remote, outwardly facing surfaces of said limbs of said clamp are at least at the same spacing as mutually inwardly facing surfaces of the jaws in the released, closed position of the spring band clip so that said clamp is positionable between the jaws to secure the spring band clip in the closed position.

14. A holding device as in claim 8, wherein said connecting body surrounds and is fixedly pre-mounted on the tubular element.

15. A holding device as in claim 8, wherein said connecting body surrounds and is formed integrally with the tubular element.

16. A holding device as in claim 8, wherein said connecting body is in the form of a ring and is pressed on a thickened portion of the tubular element.

17. A holding device comprising:

a plurality of holding arms positioned substantially parallel to an axis; and a connecting body secured to said holding arms at one end of said holding arms to connect together said holding arms;

a clip band having an axial width;

wherein each of said holding arms has a radially inward side with a respective groove defined therein;

said grooves of said holding arms are in the same transverse plane and have a width corresponding to the axial width of the clip band so that the clip band is receivable within said grooves;

said holding arms are spaced substantially equidistant from said axis such that said holding arms bear against the periphery of the clip band received within said grooves of said holding arms when the clip band is in an open, unclamped position, said holding arms being elastically bendable;

a clamp for positioning over the clamping jaws of the spring band clip to maintain the clip band in an open position; and a connecting member coupled between said connecting body and said clamp, said connecting member permitting said clamp to be pivoted away from the clamping jaws of the clip while remaining connected to said connecting body.

18. A holding device as in claim 17, wherein said holding arms are spaced about said axis so that in their relaxed condition said holding arms bear against the periphery of the clip band accommodated within said grooves when the clip band is in an open position.

19. A holding device as in claim 18, wherein said holding arms are spaced about said axis so that in their stressed condition said holding arms are bent radially outwardly and bear against the open, stressed clip band accommodated within said grooves and in their relaxed condition said holding arms bear against the released clip band closed.

20. A holding device as in claim 18, wherein each of said holding arms has a free end, said free ends of said holding arms being opposite the ends connected by said connecting body and having an inclined surface, the clamp running along said inclined surfaces of said free ends of said holding arms during insertion between said holding arms to be positioned within said grooves.

21. A holding device as in claim 18, wherein said connecting member further comprises:

an elastically bendable carrier connected to said connecting body; and a film hinge, said clamp being connected to said carrier via said hinge.

22. A holding device as in claim 17, wherein the clip band is a spring band clip having radially outwardly extending clamping jaws, said holding device further comprising a clamp for positioning over the clamping jaws of the spring band clip to maintain the clip band in an open position, wherein:

said clamp has a transverse portion and a pair of limbs extending downwardly from said transverse portion to engage the clamping jaws of the clip band; and mutually remote outwardly facing surfaces of said limbs of said clamp are at least at the same spacing as mutually inwardly facing surfaces of the clamping jaws in the released, closed position of the spring band clip so that said clamp is positionable between the clamping jaws to secure the spring band clip in the closed position.

23. A holding device as in claim 17, wherein said connecting body surrounds and is fixedly pre-mounted on the tubular element.

24. A holding device as in claim 17, wherein said connecting body surrounds and is formed integrally with the tubular element.

25. A holding device as in claim 17, wherein said connecting body is in the form of a ring and is pressed on a thickened portion of the tubular element.

* * * * *